G. CLAUDE.
PURIFICATION OF GASES.
APPLICATION FILED JUNE 20, 1914.
1,212,456.
Patented Jan. 16, 1917.
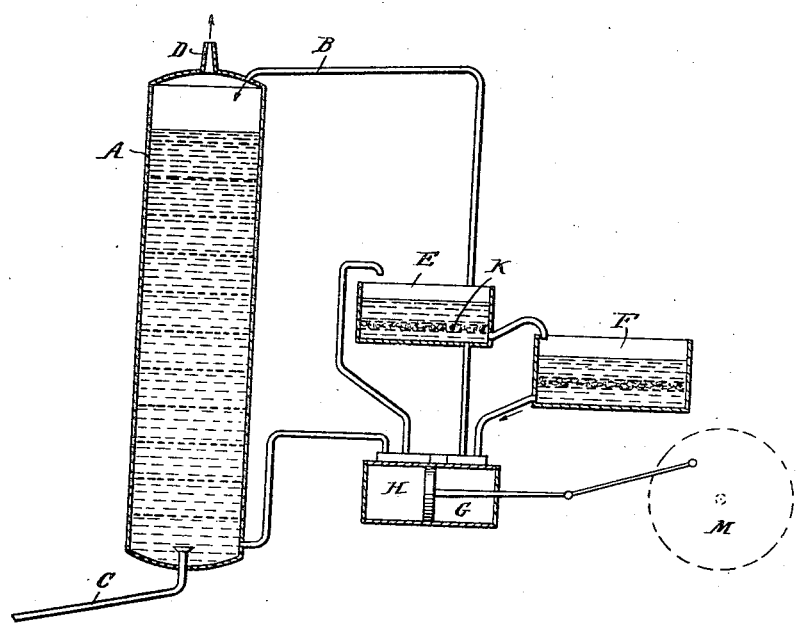
Inventor:
Georges Claude
By
Attys.

UNITED STATES PATENT OFFICE.

GEORGES CLAUDE, OF PARIS, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

PURIFICATION OF GASES.

1,212,456.  Specification of Letters Patent.  Patented Jan. 16, 1917.

Application filed June 20, 1914. Serial No. 846,285.

*To all whom it may concern:*

Be it known that I, GEORGES CLAUDE, a citizen of the French Republic, residing at 48 Rue St. Lazare, Paris, in the Republic of France, have invented certain new and useful Improvements Relating to the Purification of Gases, of which the following is a specification.

This invention relates to the purification of gases. In the liquefaction of gases it is in many cases necessary to remove as far as possible the carbonic acid gas that enters to a greater or less extent into their composition and that, by its solidification in the tubes of the liquefying plant, would quickly give rise to obstruction of the tubes, if it were not previously removed. This consideration applies in particular to the liquefaction of air, water gas of normal composition, and water gas modified by catalysis or by its passage over hydrated lime, or otherwise; the problem of removing carbonic acid gas or other analogous gases may be important in many other cases, and the present invention extends of course to such cases.

In order to remove carbonic acid gas, when only a very small proportion of it is present, as is the case with atmospheric air, chemical absorption may be resorted to, for instance by circulating sodium hydrate solution or milk of lime in suitable towers through which the air is passed. When however, the proportion of carbonic acid is high, the chemical method of removal is too costly, and a physical method is frequently adopted consisting in compressing the gas to be purified and causing it to circulate in absorption towers or similar apparatus in the opposite direction to a current of water forced under pressure through the tower, the water thereby becoming charged with dissolved carbonic acid gas which becomes liberated as soon as the pressure on the water is relieved, whereupon this water can be employed again, if desired. The energy required to force the water through the tower under pressure can be largely recovered, as the water discharges, by devices readily conceivable. This physical method of removing the carbonic acid gas is especially suitable if the gas being purified must be under compression for a reason independent of the purifying process, which is precisely the case in liquefaction processes. It is found however that, though the water readily removes the greater part of the carbonic acid gas, it is unable to remove the last traces. For example, it is difficult to reduce the proportion to less than one thousandth without resorting to excessively high absorption towers and excessive quantities of circulating water. As this proportion of carbonic acid gas is too great, when the gas thus partially purified is to be subjected to a process of liquefaction, it is necessary to supplement the physical method of purification referred to by a separate chemical method of purification, such for example as causing the partially purified gas to pass through a tower in which a solution of sodium hydrate is injected by a pump. This double treatment, however, is undesirably complicated, and the chief object of the present invention is to effect thorough purification without necessitating complication of procedure or apparatus.

According to the present invention a single volume of liquid is utilized to effect a physical and also a chemical method of purification in a single plant or apparatus. For this purpose there is added to the water that effects the physical method of purification of the gases under pressure by absorbing and holding in solution the greater part of the carbonic acid gas a very small quantity of a chemical substance such as enables the chemical method of purification to become effective in removing the last traces of carbonic acid gas. For example, the gas to be purified may pass upward under pressure in a tower in which the liquid is circulated, the physical method of purification then being in operation in the lower part of the tower and the chemical method in operation in the upper part thereof. As the amount of the chemical substance needed in the water is quite small, it is unable to alter appreciably the dissolving power of the water. For example sodium hydrate can be employed as the chemically absorbent substance, or even lime, the solubility of the latter being sufficient to render it unnecessary to add as much as would result in even dilute milk of lime. Partly saturated lime water is quite sufficient and the circulation of such a liquid in the pumps and the tower or towers presents no difficulty. If, for example, the proportion of carbonic acid gas in admixture with the gas to be purified is reduced to two-thousandths by an injection into the tower of forty liters of water per cubic foot of gas, it is sufficient if these forty liters contain only five grams of lime to insure the removal of the remaining carbonic acid gas, whereas in forty liters of water it would be possible to dissolve as much as forty grams of lime.

The invention is illustrated diagrammatically by way of example in the accompanying drawing, in which—

A is the liquid tower, B is the inlet for the lime water under pressure, C is the inlet for the impure compressed air, D is the outlet for pure air, E is the filtering reservoir where the impure air is deprived of its carbonic gas and is freed by the filter K of its carbonate of lime content, F is the reservoir where the water which is filtered in the filtering reservoir E is recharged with lime, G is the liquid compression pump, H is the expander for recovering the energy of the water under pressure. In the embodiment which is shown merely by way of example, the head of impure water acts directly on the piston which compresses the pure water. And M is the motor which drives the pump G.

This employment of lime water is particularly suitable because it is extremely economical, and because carbonate of lime is only slightly soluble, thereby increasing the possibility of complete absorption. It should be noted that the quantity of chemical reagent used (whether lime or some other substance) should not greatly exceed the amount absolutely necessary, because any excess is neutralized by the carbonic acid gas in the lower zones of the tower and cannot be utilized subsequently in cases where, as is natural, the water is caused to circulate indefinitely in a cycle, at one point of which the water becomes charged with reagent, for instance lime, which latter is precipitated in the tower as carbonate of lime, the separation of suspended carbonate being effected by filtration before the water is again charged by passing over lime.

It is to be understood that the above described application of the invention and the particular method of operation are given by way of example only, and that the principle of the invention consists essentially in causing a physical method of purification by dissolving under pressure to be followed in one and the same apparatus and in a single operation by a chemical method of purification carried out by the aid of one and the same volume of liquid, this liquid being selected to serve the double purpose. It is to be noted that other impurities, such as sulfureted hydrogen, can be removed simultaneously with the carbonic acid gas, if the chemical reagent in the water is suitably selected.

The above described process is generally applicable to the removal, from a mixture of gases, of gaseous impurities analogous to carbonic acid gas in certain of their chemical and physical properties, as for example sulfurous acid, and sulfureted hydrogen.

What I claim and desire to secure by Letters Patent of the United States is:—

1. A method of completely removing from impure gases in a single operation gaseous impurities which are both susceptible of being absorbed by the physical action of a liquid pressure and of reacting chemically with an appropriate substance in solution in the liquid, consisting in subjecting the same volume of impure gases under pressure in one and the same apparatus and at successive stages in the same operation first to the physical absorbing action of a liquid under pressure and then to the action of a chemical substance held in solution in the same volume of liquid, said substance being capable of chemically reacting with the impurities, so that the gases are first subjected to the physical absorbing action of the liquid under pressure, whereby a large proportion of the impurities are dissolved and held in solution in the liquid, and finally to a chemical reaction with the chemical substance in the liquid whereby the last traces of the impurities are removed.

2. A method of removing carbonic acid gas from impure gases in a single operation consisting in subjecting the same volume of impure gases under pressure in one and the same apparatus and at successive stages in their passage through the apparatus first to the physical absorbing action of a liquid under pressure whereby the major portion of the carbonic acid gas is dissolved and held in solution in the liquid, and thereafter to the action of a chemical substance capable of chemically reacting with carbonic acid gas and contained in the same volume of liquid whereby the last traces of carbonic acid gas are removed.

3. A continuous method of purifying gases containing gaseous impurities which are capable of being dissolved and held in solution in a liquid under the influence of pressure and also of chemically reacting with an appropriate substance in solution in the liquid, consisting in effecting, in one and the same apparatus and with one and the same liquid during the passage of the same volume of gas through the liquid, first the removal of part of the impurity in a volume of the gas under pressure by the absorbing action thereon of the liquid under pressure subsequent to its chemical reaction with traces of impurity remaining in a preceding quantity of the gas, and then the removal of the remaining traces of impurity in the aforesaid volume by the chemical action thereon of a succeeding volume of the liquid, the latter being then used to effect a removal, by absorption of part of the impurity of a succeeding quantity of the gas to be purified.

4. A continuous method of purifying gases containing carbonic acid or analogous gas from gases containing the same as impurity, consisting in subjecting the same volume of gases in one and the same apparatus to direct contact with a volume of water under pressure containing in solution a sufficient quantity of a substance capable of removing chemically from the gas the traces of impurity not removed by a preceding physical action of absorption by the same volume of water under pressure so as to effect first the removal of part of the impurity in a volume of the gas under pressure by the absorbing action thereon of the liquid under pressure subsequent to its chemical reaction with traces of impurity remaining in a preceding quantity of the gas, and then the removal of the remaining traces of impurity in the aforesaid volume by the chemical action thereon of a succeeding volume of the liquid, the latter being then used to effect a removal by absorption, of part of the impurity of a succeeding quantity of the gas to be purified.

5. A continuous method of purifying gases containing carbonic acid gas from air or gases containing the same as impurity, consisting in subjecting the same volume of gas in one and the same apparatus to direct contact with a stream of water under pressure containing in solution a small quantity of lime or sodium hydrate, so as to effect first the removal of part of the impurity in a volume of the air or gas under pressure by the absorbing action thereon of the solution under pressure subsequent to its chemical reaction with traces of impurity remaining in a preceding quantity of the air or gas, and then the removal of the remaining traces of impurity in the aforesaid volume by the chemical action thereon of a succeeding volume of the solution, the latter being then used to effect a removal, by absorption, of part of the impurity of a succeeding quantity of the air or gas to be purified.

6. A continuous method of purifying gases containing carbonic acid gas from air or gases containing the same as impurity consisting in subjecting the same volume of gas in one and the same apparatus to direct contact with a stream of water under pressure containing in solution a small quantity of lime or sodium hydrate so as to effect first the removal of part of the impurity in a volume of the air or gas under pressure by the absorbing action thereon of the solution under pressure subsequent to its chemical reaction with traces of impurity remaining in a preceding quantity of the gas, and then the removal of the remaining traces of impurity in the aforesaid volume by the chemical action thereon of a succeeding volume of the solution, the latter being then used to effect a removal, by absorption, of part of the impurity of a succeeding quantity of the gas to be purified, removing the liquid from the presence of the air or gas under treatment, relieving the pressure on the liquid to allow the carbonic acid gas in solution to become liberated, recharging the liquid with a fresh quantity of lime or sodium hydrate, and utilizing the recharged liquid in purifying a further quantity of the air or gas.

In testimony whereof I affix my signature in presence of two witnesses.

GEORGES CLAUDE.

Witnesses:
PIERRE HOURLIER,
HANSON C. COXE.